(12) United States Patent
Abdo

(10) Patent No.: US 11,959,259 B1
(45) Date of Patent: Apr. 16, 2024

(54) FOG AND RAIN COLLECTOR

(71) Applicant: KING SAUD UNIVERSITY, Riyadh (SA)

(72) Inventor: Basem Motea Abdullah Abdo, Riyadh (SA)

(73) Assignee: KING SAUD UNIVERSITY, Riydah (SA)

( * ) Notice: Subject to any disclaimer, the term of this patent is extended or adjusted under 35 U.S.C. 154(b) by 0 days.

(21) Appl. No.: 18/244,564

(22) Filed: Sep. 11, 2023

(51) Int. Cl.
*E03B 3/28* (2006.01)
*B01D 5/00* (2006.01)
*B01D 53/26* (2006.01)

(52) U.S. Cl.
CPC .............. *E03B 3/28* (2013.01); *B01D 5/0033* (2013.01); *B01D 53/268* (2013.01)

(58) Field of Classification Search
CPC ................................ B01D 53/268; E03B 3/28
See application file for complete search history.

(56) References Cited

U.S. PATENT DOCUMENTS

| 6,869,464 | B2 |   | 3/2005 | Klemic |         |
|-----------|-----|---|--------|--------|---------|
| 10,724,213 | B2 | * | 7/2020 | Khouw  | E03B 3/28 |
| 2020/0277762 | A1 |   | 9/2020 | Tejada Herrera | |

FOREIGN PATENT DOCUMENTS

| CN | 201326191 Y |   | 10/2009 |         |
|----|-------------|---|---------|---------|
| CN | 106320441 A | * | 1/2017  |         |
| DE | 102008042069 B4 |   | 9/2017 |         |
| GB | 2526786 A | * | 12/2015 | ......... E02D 29/0208 |
| KR | 101304336 B1 |   | 9/2013 |         |

* cited by examiner

*Primary Examiner* — Robert A Hopkins
(74) *Attorney, Agent, or Firm* — Nath, Goldberg & Meyer; Richard C. Litman

(57) ABSTRACT

A fog and rain collector includes a number of mesh panels and a mesh roof panel for collection of fog and rain. The mesh panels used for fog collection may be concave-shaped for greater surface area and increased fog collection. The upper edges of the mesh panels may be arranged in a polygon shape allowing for the collection of fog from all directions. The mesh panels may be mounted on support posts and a trough may be mounted beneath the mesh panels for collection of rain and fog condensate. A dustproof drain is mounted on the trough and connected to a first piping section which moves the water from the trough to a filter and then through a second piping section to a water container for storage. Support posts may used for mounting the mesh panels as well as mounting plates fasted to a surface by screws.

16 Claims, 5 Drawing Sheets

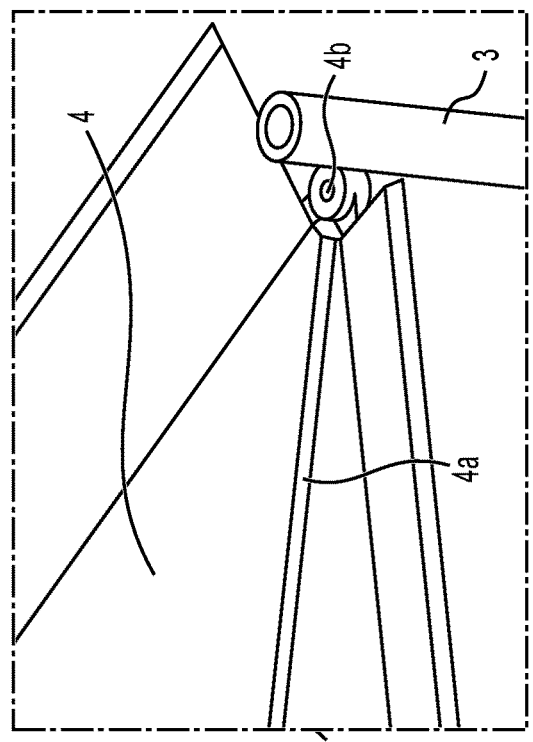
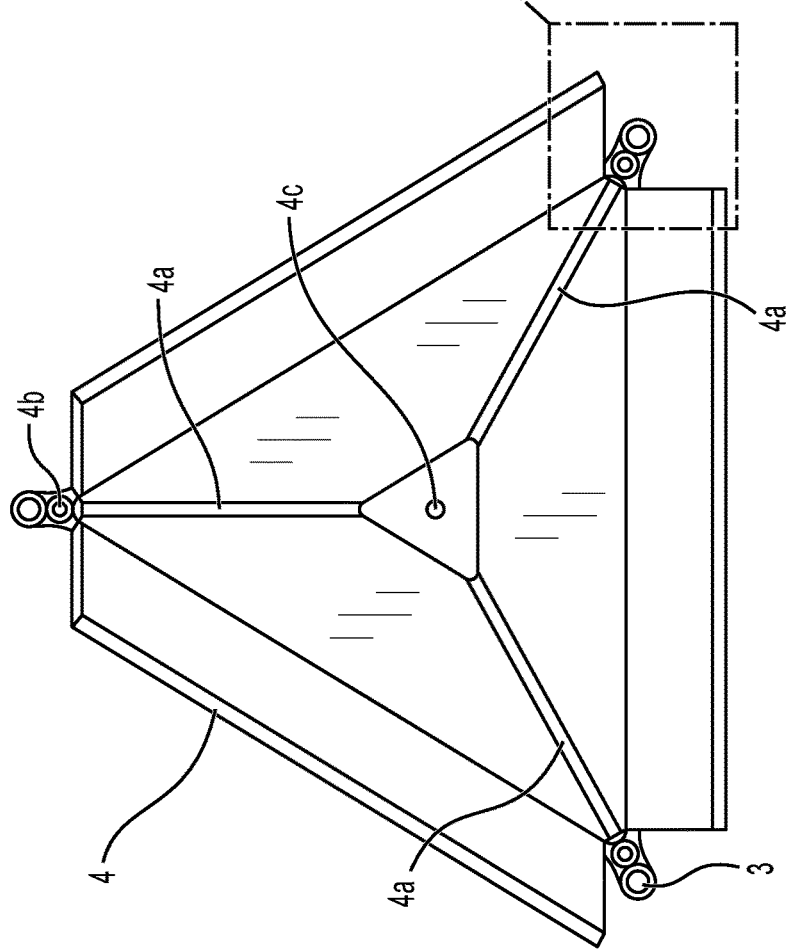
FIG. 3B
FIG. 3A

FOG AND RAIN COLLECTOR

BACKGROUND

Field

The disclosure of the present patent application relates to fog collection devices, and particularly to a device capable of collecting fog coming from any direction as well as rain.

Description of Related Art

Human survival is dependent on water. The world's main growing concerns with respect to water are freshwater scarcity and unsustainable water. It is estimated that approximately 800 million people worldwide lack basic access to drinking water, and about 2.2 billion people do not have access to a safe water supply. Saudi Arabia is an arid desert with less than 100 mm of rainfall per year and high water consumption per capita (278 L/day). The southwestern region and coastal areas in different cities and villages of Saudi Arabia experience frequent fog that could be used as an alternative source of freshwater in this otherwise dry region. This can be achieved through the use of simple and low-cost collection systems known as fog collectors. However, most of the available collectors are not very efficient. Several studies have investigated improving the fog collectors efficiency, but most of the proposed solutions are costly. A need therefore exists to improve the efficiency of fog collectors and increase the amount of water that is captured, while keeping the cost of the overall system low.

Thus, a fog and rain collector solving the aforementioned problems is desired.

SUMMARY OF THE INVENTION

The fog and rain collector includes a number of mesh panels and a mesh roof panel for collection of fog and rain. In an embodiment, the mesh roof panel contacts the upper edges of the mesh panels. The mesh panels used for fog collection may be concave-shaped for greater surface area and increased fog collection. The mesh panels may be arranged in a polygon shape along the upper edges for increased efficiency and allowing for the collection of fog from all directions. In a non-limiting example, the polygon formed by the upper edges of the mesh panels is a triangle. The mesh panels may be mounted on support posts and a trough may be mounted beneath the mesh panels for collection of rain and fog condensate. A dustproof drain is mounted on the trough and connected to a first piping section for drainage of water (fog condensate and rain). A first piping section moves water from the trough to a filter where the water is filtered before moving through a second piping section to a water container for storage.

In an embodiment, the fog and rain collector includes a mesh roof panel mounted directly above a number of mesh panels. The upper edges of the mesh panels may form sides of a polygon. The mesh roof panel may likewise be a polygon corresponding to the shape formed by the upper edges of the mesh panels.

The mesh panels of the fog and rain collector may be mounted upright on support posts. The support posts may be held upright by mounting plates which are fastened to a surface. In a non-limiting embodiment, the support posts are fastened to the surface by screws.

These and other features of the present subject matter will become readily apparent upon further review of the following specification.

BRIEF DESCRIPTION OF DRAWINGS

FIG. 3A is an overhead view of a trough of the fog and rain collector.
FIG. 3B is a close-up perspective view of a mounting arrangement of the trough of the fog and rain collector.

Similar reference characters denote corresponding features consistently throughout the attached drawings.

DETAILED DESCRIPTION

Fog collectors are generally known, but as mentioned above, most known fog collectors are inefficient at capturing fog condensate. Several factors affect the efficiency of the fog collectors, including climate factors, wind direction, wind velocity, atmospheric pressure, relative humidity, fog water content, and fog droplet size. Other factors affecting efficiency of fog collectors are related to the orientation of the fog collectors with respect to wind direction, drainage characteristics, and the topography of the area in which the fog collector is located.

In addition, many known fog collectors use a mesh material to trap the fog condensate and rain water. It is important to choose the correct mesh to have as efficient a fog collection system as possible. Factors to be considered when choosing the optimal mesh material include the type of mesh material, possible coating, and/or shade coefficients. The size and structure of the mesh are also considerations.

In order to generate more potable water, the use of a fog and rain collector according to the present disclosure has a number of advantages. The present fog and rain collector is static, that is it does not require any energy to operate. The fog and rain collector provides an additional source of freshwater in dry costal and mountainous regions where it may be otherwise difficult to source drinking water, thus minimizing costs and the need to transport freshwater into those areas where the fog and rain collectors are deployed. Additionally, the water produced by the present fog and rain collection system is clean water that can be used immediately after harvesting.

Figure 1A:
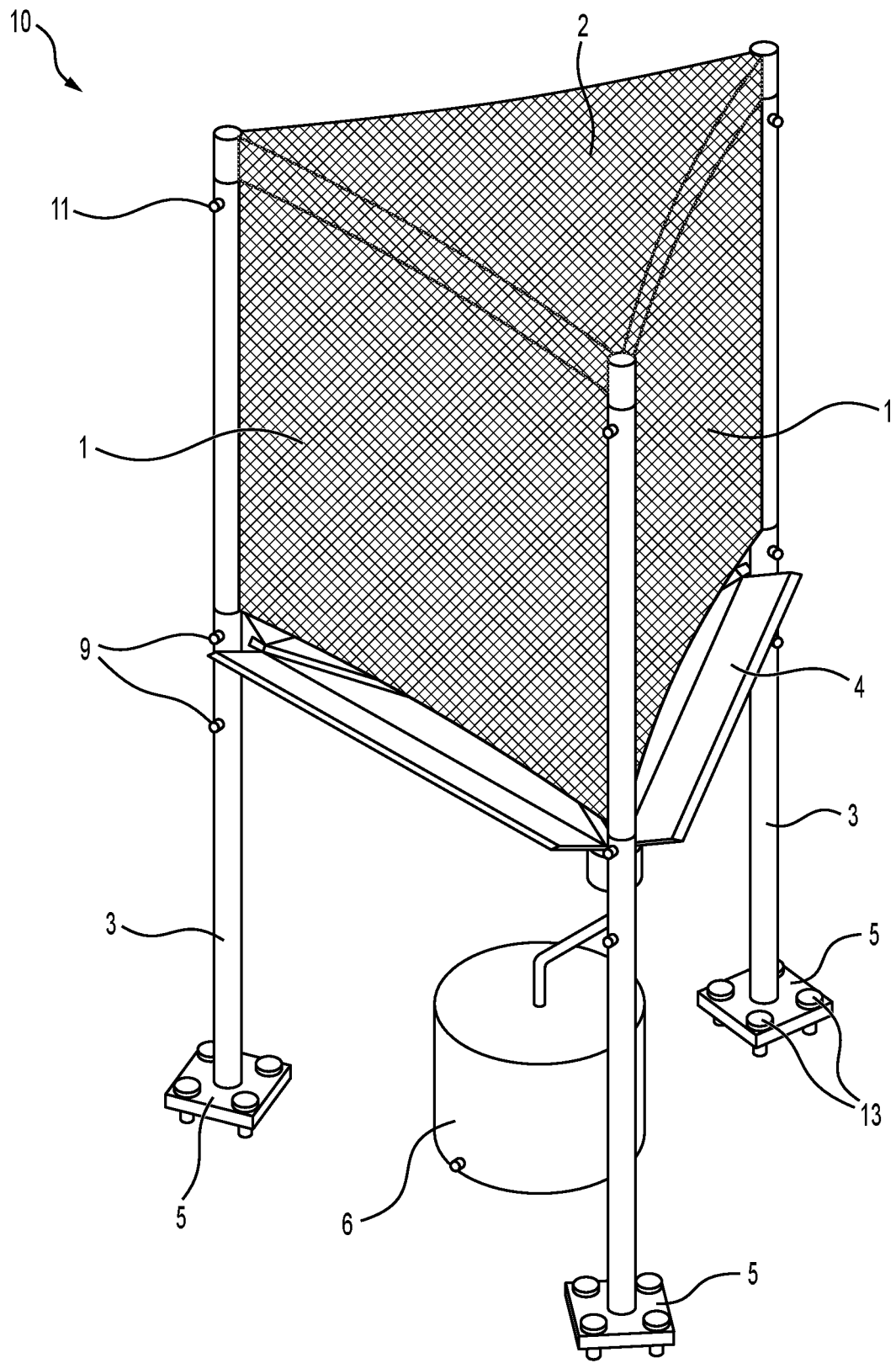
FIG. 1A is a perspective view of the fog and rain collector.

The fog and rain collector 10 is shown in FIG. 1A including a number of mesh panels 1 and a mesh roof panel 2. Mesh panels 1 and mesh roof panel 2 serve to collect fog from any direction, as well as rain. Each of mesh panels 1 may be concave shaped with respect to a point in the center of the polygon formed by mesh panels 1. The concave shape results in increased surface area and increased fog collection. During use, when mesh panels 1 come into contact with fog or rain, droplets are deposited on the mesh material. The droplets combine to form larger droplets and travel by gravity to a lower position from which they may be collected and stored. In other words, the droplets grow in size as they acquire more droplets when moving down mesh panels 1.

Mesh panels 1 and mesh roof panel 2 are made of a suitable mesh material for collecting fog condensate and rain. In a non-limiting example, mesh panels 1 may be formed of a material such as Raschel mesh. Mesh roof panel 2 may be of the same or different material as mesh panels 1.

Mesh panels 1 are mounted upright on support posts 3 using any suitable means such as, in a non-limiting example, screws 11. Other non-limiting fasteners include rivets, nails, adhesive, hook-and-loop fasteners, and the like. A trough 4 is mounted beneath mesh panels 1 for collection of rainwater and fog condensate gathered on mesh panels 1 and mesh roof panel 2. The water collected by trough 4 is stored in a container 6. Trough 4 is mounted to supports posts 3 beneath mesh panels 1. Mounting plates 5 hold support posts 3 in an upright position and are fixed to a surface by screws 13.

Figure 1B:
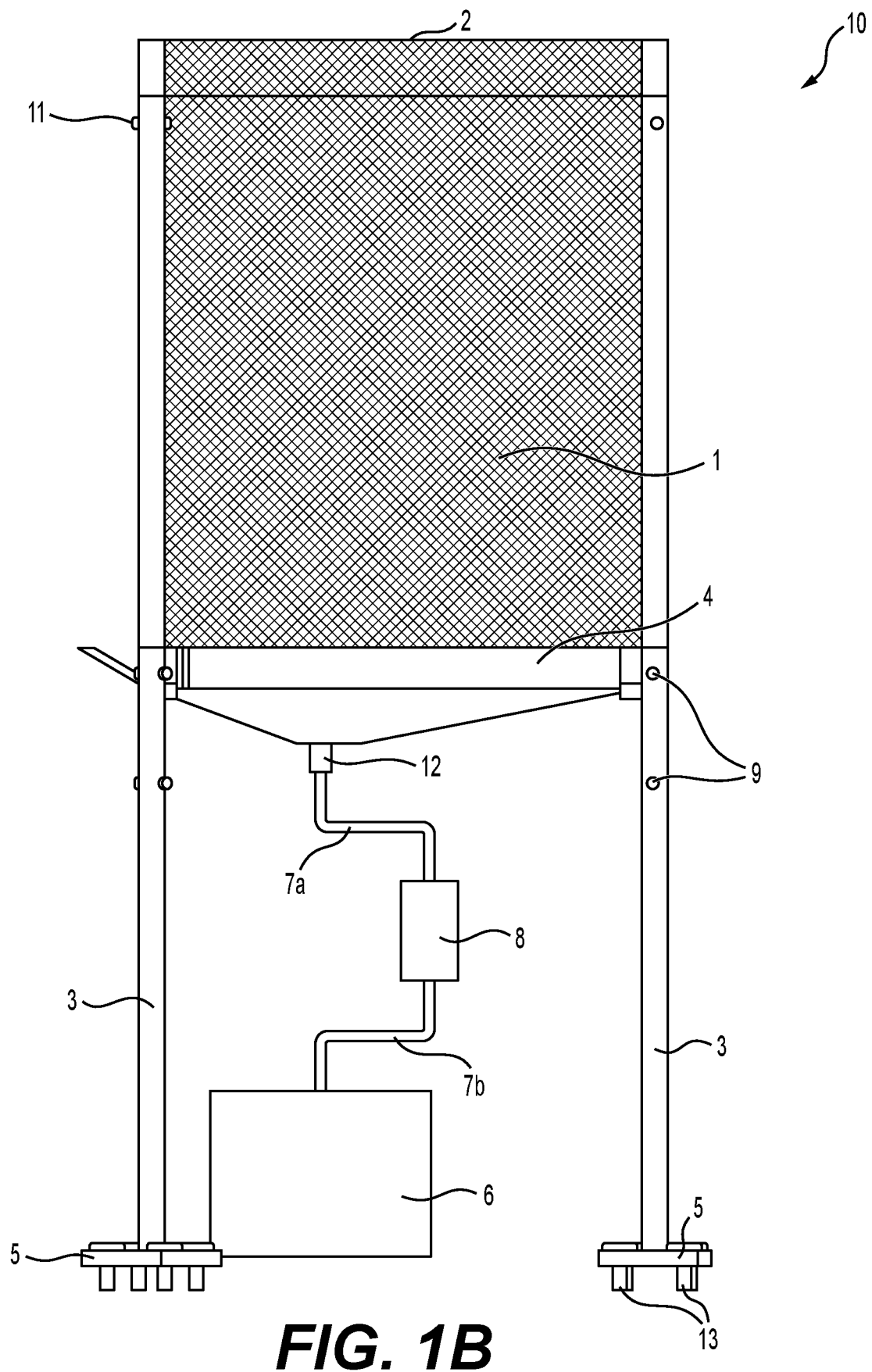
FIG. 1B is a front view of the fog and rain collector.

Referring to FIG. 1B, in a non-limiting example, trough 4 includes a dustproof drain connection 12 connected to a first piping section 7a. First piping section 7a is fluidly connected and carries water from trough 4 through a filter 8 to a container 6 by way of a second piping section 7b. Although a single filter and storage container are shown, any suitable combination of piping sections, filters, and/or storage containers may be used for the filtration and/or storage of the fog condensate and rainwater. For example, it is contemplated that trough 4 contains multiple drain points, to which a corresponding number of multiple first piping sections 7a, filters 8, second piping sections 7b and storage containers 6 are assembled. Depending on the size of fog and rain collecter 10, it could be possible to increase the efficiency by increasing the number of drains, pipings, filters and storage containers.

Figure 2A:
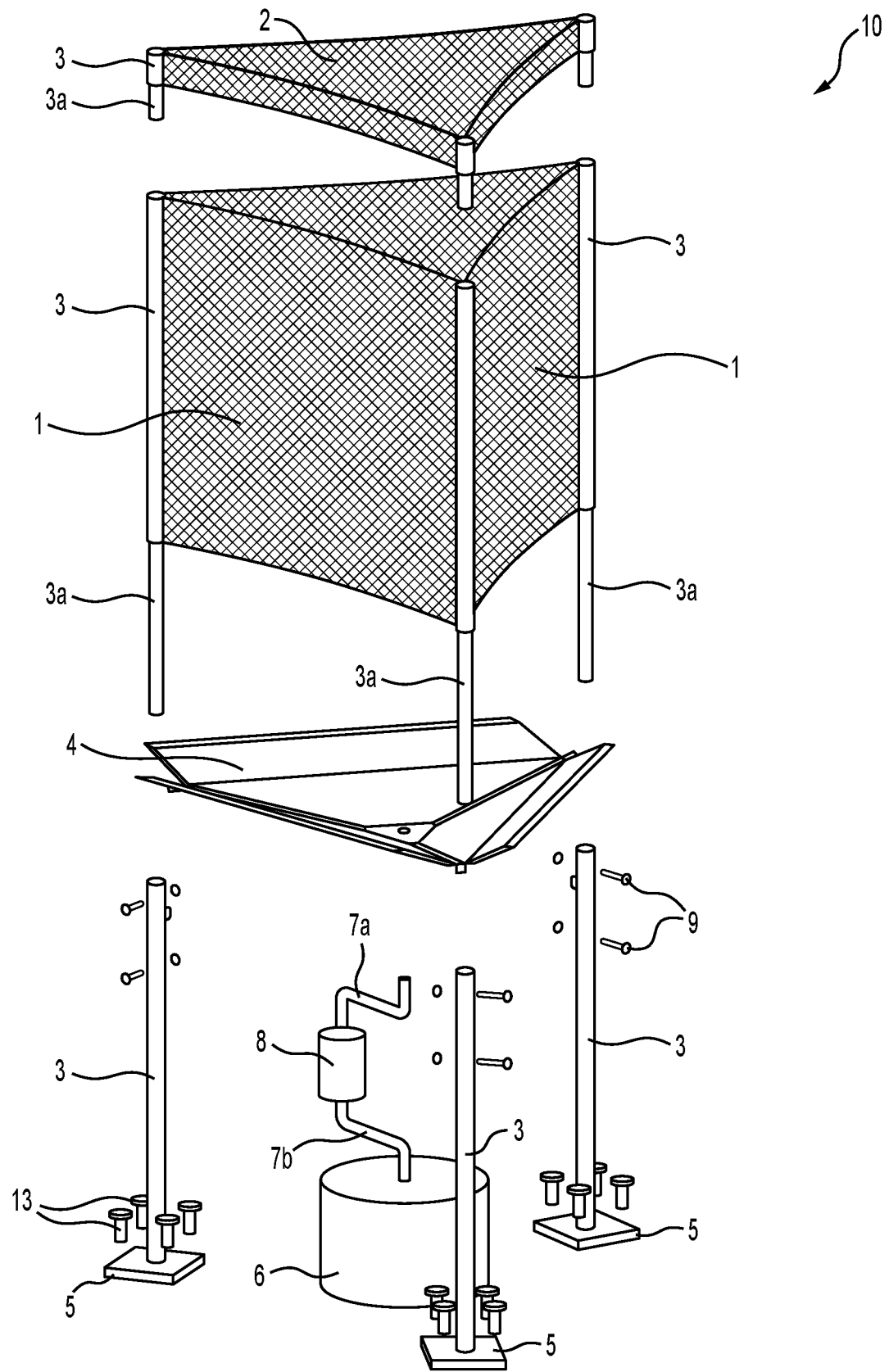
FIG. 2A is an exploded perspective view of the fog and rain collector.

FIG. 2A shows an exploded view of fog and rain collector 10. In a non-limiting example, support posts 3 are used to hold together the mesh panels 1, mesh roof panel 2, and trough 4 in an upright position. Sections of support posts 3 are joined together through a male connection end 3a fitted within an open top of support posts 3. Screws 9 are used to fasten together upper and lower sections of support posts 3.

Figure 2B:
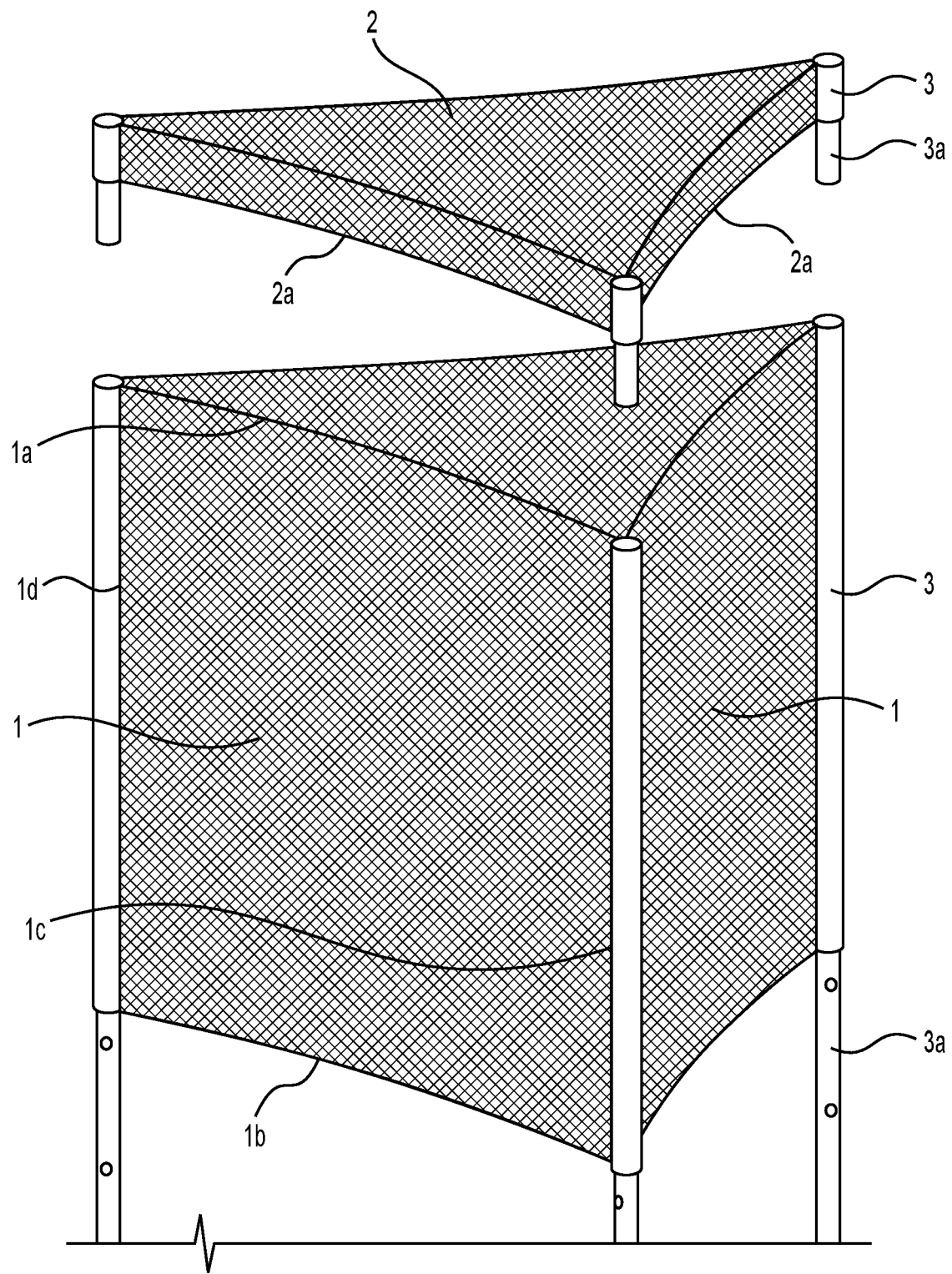
FIG. 2B is a perspective view of the mesh panels and roof panel of the fog and rain collector.

FIG. 2B shows a close-up view of mesh panels 1 and mesh roof panel 2. Mesh panels 1 have upper edges 1a, lower edges 1b and side edges 1c, 1d for mounting to the support posts 3. In a non-limiting example, mesh roof panel 2 has a number of sides 2a corresponding to the number of mesh panels 1. In a further non-limiting example, sides 2a of roof panel 2 are mounted in contact with upper edges 1a of mesh panels 1. Upper edges 1a of mesh panels 1 form a triangular shape to better capture more fog from the wind, depending on the wind direction. However, the triangular shape is not meant to be limiting, as upper edges 1a of mesh panels 1 may form any polygonal shape such as a triangle, quadrilateral, pentagon, or other polygonal shape.

FIG. 3A is an overhead view of trough 4 of the fog and rain collector 10. Trough 4 is mounted within slots 4b fitted on support posts 3 as shown in the close-up view of FIG. 3B. A number of grooves 4a channel water to a drain hole 4c in the center of trough 4. In the present embodiment, drain hole 4C is a dustproof drain. In addition, drain hole 4c is at a lower height than mounting slots 4b such that grooves 4a slant downward and allow the flow of water towards drain hole 4c. When viewed from an overhead position, trough 4 may be generally polygonal in shape, and correspond to the shape formed by upper edges 1a of mesh panels 1.

It is to be understood that the fog and rain collector is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A fog and rain collector, comprising:
a plurality of mesh panels; and
a roof panel, wherein the roof panel contacts upper edges of said plurality of mesh panels,
wherein each of said plurality of mesh panels are concave-shaped.

2. The fog and rain collector as recited in claim 1, wherein the roof panel is formed from a mesh material.

3. The fog and rain collector as recited in claim 1, wherein the upper edges of said plurality of mesh panels form sides of a polygon.

4. The fog and rain collector as recited in claim 3, wherein the polygon is a triangle.

5. The fog and rain collector as recited in claim 4, wherein said plurality of mesh panels are mounted on support posts.

6. The band selection guide as recited in claim 5, further comprising a trough mounted on the support posts beneath said plurality of mesh panels.

7. The fog and rain collector as recited in claim 6, further comprising a first piping section connected to a dustproof drain connection of said trough.

8. The fog and rain collector as recited in claim 7, wherein said first piping section is fluidly connected to a filter, and said filter is fluidly connected to a water container by a second piping section.

9. A fog and rain collector, comprising:
a plurality of mesh panels, wherein upper edges of said plurality of mesh panels form sides of a polygon; and
a roof panel mounted directly above said plurality of mesh panels,
wherein each of said plurality of mesh panels are concave-shaped.

10. The fog and rain collector as recited in claim 9, wherein the roof panel is formed from a mesh material.

11. The fog and rain collector as recited in claim 9, wherein said roof panel is a polygon corresponding to the polygon formed by the upper edges of said plurality of mesh panels.

12. The fog and rain collector as recited in claim 11, further comprising a trough mounted beneath said plurality of mesh panels.

13. The fog and rain collector as recited in claim 12, further comprising a first piping section in fluid connection with a dustproof drain connection of said trough.

14. The band selection guide as recited in claim 13, wherein said first piping section fluidly connects to a filter, and said filter is fluidly connected to a water container by a second piping section.

15. The fog and rain collector as recited in claim 14, wherein said mesh panels are mounted on support posts.

16. The fog and rain collector as recited in claim 15, wherein said support posts are mounted on mounting plates.

* * * * *